(12) United States Patent
Spandern et al.

(10) Patent No.: US 7,854,303 B2
(45) Date of Patent: Dec. 21, 2010

(54) FRICTION LINING

(75) Inventors: Christian Spandern, Elkenroth (DE); Michael Hofmann, Limburg (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/571,497

(22) Filed: Oct. 1, 2009

(65) Prior Publication Data

US 2010/0012449 A1 Jan. 21, 2010

Related U.S. Application Data

(63) Continuation of application No. PCT/DE2008/000397, filed on Mar. 6, 2008.

(30) Foreign Application Priority Data

Apr. 2, 2007 (DE) .................. 10 2007 015 881

(51) Int. Cl.
   *F16D 69/02* (2006.01)
(52) U.S. Cl. .................. 188/251 M; 188/251 A
(58) Field of Classification Search .......... 188/251 A, 188/251 M, 218 XL, 218 A; 156/180; 428/37, 428/66.2, 292.1, 174
   See application file for complete search history.

(56) References Cited

U.S. PATENT DOCUMENTS

| | | | | |
|---|---|---|---|---|
| 3,713,934 | A * | 1/1973 | Morton | 156/180 |
| 4,118,528 | A * | 10/1978 | Lowry | 428/66.2 |
| 4,244,994 | A * | 1/1981 | Trainor et al. | 428/37 |
| 4,349,595 | A * | 9/1982 | Trainor et al. | 428/66.2 |
| 5,717,263 | A * | 2/1998 | Cox | 310/74 |
| 6,251,519 | B1 * | 6/2001 | Yamamura et al. | 428/369 |
| 6,944,935 | B2 * | 9/2005 | Hache | 29/598 |
| 2009/0053502 | A1 * | 2/2009 | Spandern | 428/292.1 |
| 2010/0018816 | A1 * | 1/2010 | Spandern et al. | 188/251 A |
| 2010/0080960 | A1 * | 4/2010 | Spandern et al. | 428/174 |

FOREIGN PATENT DOCUMENTS

| | | |
|---|---|---|
| DE | 10 2004 038 773 Y | 3/2005 |
| GB | 2 056 369 Y | 3/1981 |
| GB | 2 269 640 XY | 2/1994 |
| WO | 2007/121704 PX | 11/2007 |

* cited by examiner

*Primary Examiner*—Christopher P Schwartz
(74) *Attorney, Agent, or Firm*—Lucas & Mercanti, LLP

(57) ABSTRACT

A method for producing a friction lining. The friction lining is wound in three layers with different winding ratios.

19 Claims, 1 Drawing Sheet

FRICTION LINING

This application is a Continuation of PCT/DE2008/000397 filed Mar. 6, 2008, which in turn claims the priority of DE 10 2007 015 881.7 filed Apr. 2, 2007, the priority of both applications is hereby claimed and both applications are incorporated by reference herein.

The invention relates to a friction lining and to methods for producing a friction lining, in particular for clutch disks, brakes or the like, according to the preamble of claims 1 and 14.

PRIOR ART

Clutch linings of this type are used, in particular, for friction clutches in motor vehicles, in which they are riveted to a metallic carrier plate or clutch disk, in order, in conjunction with a counter element, to allow a transfer of force between an engine and a transmission in the coupled state and to uncouple this transfer of force when the clutch is open.

In this case, the clutch linings have to satisfy stringent requirements, because they are to fulfill several requirements which cannot readily be achieved in the same way. In particular, the clutch lining should have a high bursting rotational speed so as not to be destroyed by centrifugal forces, possess a high coefficient of friction by means of which a high torque can be transferred, and at the same time have low wear and be resistant to shape-changing distortion due to heat and/or force influences. The clutch linings should nevertheless be capable of being produced in as uncomplicated a way as possible and therefore economically.

To increase the bursting strength, that is to say the strength of the clutch lining in the circumferential direction, it is already known to deposit binder-impregnated yarn material wave-like in a plurality of flat plies in the circumferential direction, the turns of the strand material having radially inner and radially outer reversal regions which lie on concentric circles (DE 44 20 291 B4). In particular, the reversal regions of the turns may in each case be distributed on a plurality of concentric circles having different diameters, the radii of the circles differing from one another sufficiently to avoid thickenings at the margins of the clutch lining or lining body which may otherwise lead to pressure damage in the yarn material. The fraction of yarn material in the overall composition of the lining body material can consequently be increased.

Winding mostly takes place with the aid of a winding machine, one ply being wound in the circumferential direction per revolution, as defined.

Such yarn material wound in the form of an annular disk, as shown, for example, in FIG. 1, is also designated as a winding or pressed preform. The imaginary circle with an outside diameter of the friction part in the form of an annular disk is itself also designated as the outside diameter of the winding, and the same applies to the inside diameter. The radially inner and radially outer reversal regions of the turns in the yarn material wound in the form of an annular disk are tangent to the inside and outside diameter of the winding.

The winding ratio indicates how often the yarn is in each case tangent to an imaginary circle with an outside diameter of the friction part in the form of an annular disk or of the reinforcing part of similar shape or, in other words, how often the yarn is tangent to the outside diameter during one revolution of an annular part. A winding ratio of 1:2.6 shows that the yarn touches the outside diameter 2.6 times during one revolution on account of the turns. A winding ratio of 1:4 is in this case lower than a winding ratio of 1:5 and is not to be interpreted as being a division.

SET OBJECT

The object on which the invention is based is to propose a friction lining, the set-up of which allows a further improvement in terms of rotational speed strength and of dimensional stability.

According to the invention, this object is achieved by means of a method for producing a friction lining for clutches, brakes or the like.

In the method according to the invention, a friction lining is produced from at least one winding, the winding being wound from a plurality of plies of at least one impregnated yarn. In this case, a first predetermined number of plies, which form a first layer, is wound with a first predetermined winding ratio from a coherent piece of yarn. Subsequently, a second predetermined number of plies, which form a second layer, is wound with a second predetermined winding ratio from a coherent yarn. Finally, a third predetermined number of plies, which form a third layer, is wound with a third predetermined winding ratio from a coherent piece of yarn.

In a preferred embodiment, the first and third predetermined number of plies are of equal size. This number preferably lies between 3 and 7, particularly preferably there are 4 plies. The second predetermined number preferably also lies between 3 and 7 and particularly preferably amounts to 6.

In a further preferred embodiment, the first and the second and the third predetermined number of plies are of equal size. The first and second and third predetermined number in this case preferably lies between 3 and 7, and particularly preferably amounts to 5.

In a preferred embodiment, the second winding ratio is unequal to the first and the third winding ratio.

In a preferred embodiment, the second winding ratio is lower than the first and the third winding ratio.

The first and the third winding ratio are preferably of equal size.

In a particularly preferred embodiment, the first and the third winding ratio lie between 1:4.5 and 1:5.0, particularly preferably amounting to 1:4.72, and the second winding ratio lies between 1:1.0 and 1:1.3 and amounts particularly preferably to 1:1.12.

To improve the frictional or wearing properties, the first and/or the third layer are/is wound from a friction yarn and the remaining layers are wound from a reinforcing yarn. The friction yarn in this case possesses better frictional or wearing properties than the reinforcing yarn.

According to the method described above, therefore, a friction lining having the appropriate specifications with regard to layering, number of plies per layer, winding ratios and yarn type can be produced.

According to a further solution for achieving the object, a further method according to the invention and a friction lining are proposed. In this method according to the invention, a friction lining is produced from at least one winding which is wound from a plurality of plies of at least one impregnated yarn, according to the invention each ply having a different winding ratio.

In a preferred embodiment, such a winding is wound from 2 to 20 plies, particularly preferably from 5 to 15 plies.

In a further preferred embodiment, the winding ratio of plies wound directly successively in time or, in other words, of in each case two plies, of which the yarn portions forming them directly follow one another topologically along the yarn, differs in each case by the amount of an incremental or decremental predetermined value. This incremental or decremental predetermined value amounts to between 1:0.1 and 1:0.5, preferably to between 1:0.2 and 1:0.4. In this case, the winding ratio increases or decreases by the amount of this predetermined value from ply to ply, depending on whether winding was commenced with a low or high winding ratio. In this case, the predetermined interval lies between 1:1.0 and 1:6.0, particularly preferably between 1:2.0 and 1:5.0, and constitutes the predetermined maximum and minimum occurring winding ratio of the plies. Commencing with the first ply, which, for example, has a winding ratio of 1:2.0, the second ply would have a winding ratio of 1:2.3 if the predetermined incremental value amounted to 1:0.3. The third and fourth ply consequently have a winding ratio of 1:2.6 and 1:2.9, and so on and so forth, until the maximum value of, for example, 1:5.0 is reached.

In a further embodiment, the winding ratio of the plies wound directly successively in time or of plies following one another topologically along the yarn run is determined in that it is selected by determining a random number within a predetermined numerical interval which corresponds to the predetermined maximum and minimum occurring winding ratio of the plies. In this case, the predetermined interval lies between 1:1.0 and 1:6.0, particularly preferably between 1:2.0 and 1:5.0.

In a further embodiment, there may be provision for no winding ratio to occur more than once, in that, in such a case, the next random number is generated.

According to the invention, the transition from one winding ratio to another winding ratio takes place when the outside diameter of the winding is reached or, alternatively, when the inside diameter of the winding is reached during the winding operation immediately before or, alternatively, after a ply is wound completely, that is to say before or after the last turn which is wound, but is no longer included completely in the ply to be currently wound.

A further alternative involves passage through the middle between the inside and the outside diameter.

A further alternative involves overshooting a predetermined angle in the circumferential direction of the winding by means of the yarn laying device, so that all the plies change the winding ratio in this position. This position is also described by a plane through the annular winding, as illustrated in FIG. 3. In such an embodiment, all the yarn portions passing through this plane change their winding ratio where a new ply commences.

An abrupt, but also non-abrupt smooth transition from one winding ratio to another winding ratio on the outside or the inside diameter or in the positions alternatively described is possible.

According to the invention, a transition from one winding ratio to another winding ratio is provided in a predetermined transitional region. This transitional region may amount to 60 degrees in the circumferential direction. The transition from one winding ratio to another winding ratio may in this case commence, for example, 30 degrees before the outside diameter is reached or the alternative positions are reached and may have assumed the new value of the winding ratio 30 degrees after the outside diameter is reached.

In a special embodiment of the method according to the invention, there is provision for a winding ratio, which is provided for the next ply to be wound, to be checked, for example with the aid of a computer program, to determine whether a maximum number of yarn portions, which is not to be overshot so as to avoid too high a material accumulation, is consequently reached within a predetermined extent in the circumferential direction over the inside or the outside diameter. In this case, the maximum number provided is 2 to 10, particularly preferably 5, and the extent in the circumferential direction which is provided is 0.1 to 30 degrees and particularly preferably 10 degrees.

Thus, according to the method described above, a friction lining having the appropriate specifications with regard to winding ratios and transition between different winding ratios can be produced.

BRIEF DESCRIPTION OF THE DRAWINGS

Further advantages and advantageous embodiments of the inventions are the subject matter of the following figures and of their description parts. In the figures, in particular.

FIG. 1 illustrates a winding according to the prior art.

DETAILED DESCRIPTION OF THE INVENTION

Such a winding may be wound, for example, from an impregnated yarn. In this case, a yarn optimized in terms of coefficient of friction and of wear is drawn through an impregnating solution and is brought to a constant weight ratio of yarn to impregnating solution. The yarn is subsequently dried. For example, a carded yarn consisting of aramide fibers, glass staple fibers, viscose fibers and PAN fibers, and also brass wire may be used. Another example is a mixed filament yarn consisting of glass filament and metal wires. The various yarns may also be used in combination. A dispersion consisting of polymeric components, fillers and solvents is suitable as an impregnating solution. The polymeric components may consist of thermosetting components, such as, for example, phenol resin or melamine resin, and of elastomeric components, such as, for example, SBR or NBR rubber. Fillers are, for example, barium sulfate, kaolin or carbon black. The solvent used is usually water. The dried yarn is subsequently wound into a winding.

To improve the friction lining properties, a winding may also be built up from a plurality of layers of different types of impregnated yarn. First, for example, a lower layer and subsequently, for example with another yarn, a layer lying above it are wound. In this case, the winding ratios of the two layers may differ from one another.

Conventionally, a winding produced in this way is subsequently pressed with time and temperature control, then hardened and deburred and finally ground and drilled.

Figure 1:
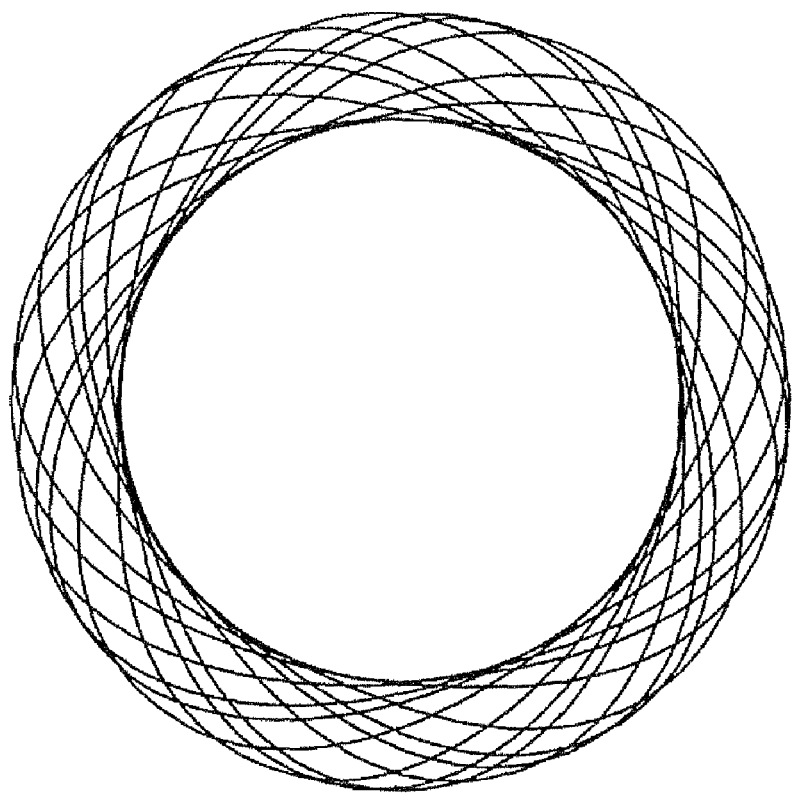
FIG. 1 shows a winding according to the prior art.
Figure 2:
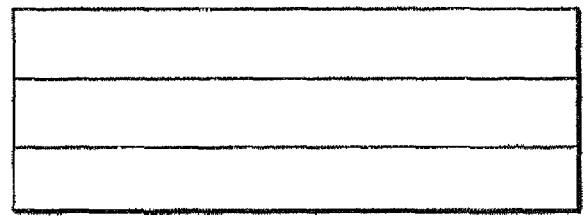
FIG. 2 shows a schematic cross section perpendicularly to the circumferential direction of a three-layer winding.

FIG. 2 illustrates schematically a three-layer winding according to the invention. The two outer layers are in this case wound with a winding ratio of 1:4.72. The middle layer has a winding ratio of 1:1.12. The three layers each consist in this example of 5 plies.

In order to produce a friction lining from such a winding, the method according to the invention, in a preferred embodiment, provides for winding the 3 layers from a coherent piece of yarn. The first 5 plies, which form the first layer, are wound with a winding ratio of 1:4.72. The second 5 plies, which form the second layer, are wound with a winding ratio of 1:1.12. Finally, once again, 5 plies, which form a third layer, are wound with a winding ratio of 1:4.72 from the coherent piece of yarn.

In a further preferred embodiment, the method according to the invention provides for winding the first 5 plies, which form the first layer, with a winding ratio of 1:4.72 from a coherent piece of yarn. Subsequently, 5 plies, which form the second layer, are wound with a winding ratio of 1:1.12 again from a coherent yarn which is not identical to the yarn of the first layer. Finally, once again, 5 plies, which form a third layer, are wound with a winding ratio of 1:4.72 from a coherent piece of yarn which matches the yarn material of the first layer, but does not form a coherent piece with the yarn of the first layer.

The 3 layers may be wound from yarn optimized in terms of wear and of rotational speed, depending on the purpose. In this case, the 3 layers may be wound from one, two or three coherent pieces of yarn.

In a preferred embodiment, the middle, second layer is omitted, so that the winding consists only of the first and third layer with a winding ratio in each case of between 1:4.5 and 1:5.0, particularly preferably of 1:4.7, one of the two layers consisting of yarn optimized in terms of wear, and the other of the two layers consisting of a yarn optimized in terms of bursting rotational speed.

Figure 3:
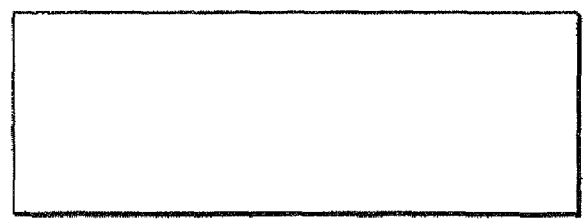
FIG. 3 shows a schematic cross section perpendicularly to the circumferential direction of a winding.

FIG. 3 illustrates the cross section perpendicular to the circumferential direction of an annular winding which consists of plies, each with a different winding ratio.

In a preferred embodiment, the winding ratio of plies wound directly successively in time or, in other words, of in each case two plies, of which yarn portions forming them directly follow one another topologically along the yarn, differs in each case by the amount of an incremental or decremental predetermined value. This incremental or decremental predetermined value may, from the range of between 1:0.1 and 1:0.5, preferably amount to between 1:0.2 and 1:0.4. In this case, the winding ratio increases or decreases by the amount of this predetermined value from ply to ply, depending on whether winding was commenced with a low or a high winding ratio. In this case, the predetermined interval preferably lies between 1:2.0 and 1:5.0.

Commencing with the first ply, which has a winding ratio of 1:2.0 in a preferred embodiment, the second ply has a winding ratio of 1:2.3, since the predetermined incremental value amounts to 1:0.3 in this embodiment. The third and fourth ply consequently have a winding ratio of 1:2.6 and 1:2.9, and so forth, until the maximum value of 1:5.0 is reached in the eleventh ply.

The number of plies may be varied by means of suitable values for the maximum and minimum occurring winding ratio and for the incremental or decremental value.

In a further preferred embodiment, an annular winding is likewise produced which consists of plies, each with a different winding ratio. This will be achieved, using random numbers from an interval of between 1:2.0 and 1:5.0 for the winding ratio. In order to avoid repetition, a random number intended as a winding ratio for a ply is rejected if this random number comes too near to a winding ratio already previously provided for another ply, that is to say the difference in amount of the two values undershoots a predetermined threshold value of between 1:0.1 and 1:0.5, preferably of 1:0.3.

In a further preferred embodiment, the transition from one winding ratio to another winding ratio takes place when the outside diameter is reached during the winding operation immediately before a ply is completely wound, that is to say before the last turn, which is no longer included completely in the ply to be currently wound, is wound.

In this case, a non-abrupt, smooth transition from one winding ratio to another winding ratio takes place on the outside diameter, without a kink in the yarn run occurring during the change in winding ratio.

According to the invention, a transition from one winding ratio to another winding ratio is provided in a predetermined transition region. This transition region may amount to 60 degrees in the circumferential direction. In a preferred embodiment, the transition from one winding ratio to another winding ratio commences 30 degrees before the outside diameter is reached and has assumed the new value of the winding ratio 30 degrees after the outside diameter is reached.

However, these methods do not allow the situation to be ruled out where a plurality of reversal regions of turns of the yarn come to lie axially one above the other in the circumferential direction at some points on the outside or the inside diameter, which may lead to undesirable thickenings at the margins of the clutch lining and cause pressure damage to the yarn material. In a further preferred embodiment, this can be avoided in that, for example immediately after the determination of a winding ratio provided for the next ply, it is ascertained at which point on the outside or the inside diameter the reversal regions of the turns of the ply belonging to this winding ratio would come to lie. It is additionally determined whether a plurality of other reversal regions from previously wound plies are already located or lie one above the other at these points. In this case, an extent in the circumferential direction of 0.1 to 30 degrees, preferably of 10 degrees, is selected as a reversal region. If more than a maximum number of preferably 5 reversal regions of already wound plies coincide or come one above the other in the circumferential direction within this region, the value for the winding ratio of the next ply to be wound is rejected, a new value is determined and it is ascertained whether the maximum number of overlaps of reversal regions is fulfilled.

In a further embodiment, a complete simulation of a possible winding is carried out on the basis of the above-described method by the storage of the plies, the winding ratio of which does not infringe the abovementioned criteria. The winding obtained by simulation is subsequently executed by means of a winding machine.

In a further embodiment, too frequent accumulations of yarn material not only on the inside and outside diameter, but also over the entire annular area, can be avoided by simulation, in that radially and circumferentially delimited test areas running parallel to the intended top side and under side of the winding obtained are checked at predeterminable intervals along the next ply to be wound with regard to the number of accumulations, and the checked ply linked to the associated winding ratio is accepted or rejected. The winding thus obtained is subsequently executed by means of a winding machine.

The invention claimed is:

1. A method for producing a friction lining for friction parts, the friction lining being produced from at least one winding, the winding being wound from only a first predetermined number of plies, which form a first layer, a second predetermined number of plies, which form a second layer, and a third predetermined number of plies, which form a third layer, wherein the first predetermined number of plies, the second predetermined number of plies and the third predetermined number of plies are each wound with a different winding ratio from a coherent piece of yarn, the yarn being impregnated, and wherein the first layer and the third layer are wound from friction yarn and the second layer is wound from reinforcing yarn.

2. The method of claim 1, wherein only winding ratios are selected resulting in only a predetermined maximum number of yarn portions within a predetermined extent in a circumferential direction reaching an inside or an outside diameter.

3. The method of claim 2, wherein the maximum number of yarn portions amounts to between 2 and 10.

4. The method of claim 2, wherein the predetermined extent in the circumferential direction amounts to 0.1 to 30 degrees.

5. The method of claim 2, wherein the predetermined maximum number of yarn portions amounts to 5.

6. The method of claim 2, wherein the predetermined extent in the circumferential direction amounts to 10 degrees.

7. The method of claim 1, wherein the winding ratio of the first predetermined number of plies, the second predetermined number of plies, and the third predetermined number of plies, which are wound directly successively in time, differ in each case by an amount of a predetermined value.

8. The method of claim 7, wherein the predetermined value amounts to between 1:0.1 and 1:0.5.

9. The method of claim 7, wherein the predetermined amounts to a ratio between 1:0.2 and 1:0.4.

10. The method of claim 1, wherein the winding ratio of the first predetermined number of plies, the second predetermined number of plies and the third predetermined number of plies are each selected within a predetermined interval by means of a random number method.

11. The method of claim 10, wherein the predetermined interval amounts to a ratio between 1:1.0 to 1:6.0.

12. The method of claim 10, wherein the predetermined interval amounts to a ratio between 1:2.0 to 1:5.0.

13. The method of claim 1, wherein a transition from one winding ratio to another winding ratio takes place in a predetermined transition region.

14. The method of claim 13, wherein the transition region amounts to 60 degrees in a circumferential direction.

15. The method of claim 1, wherein the winding is wound from between from 5 to 15 plies.

16. The method of claim 1, wherein the winding is wound from between 2 and 20 plies.

17. The method of claim 1, wherein a transition from one winding ratio to another winding ratio takes place on an outside diameter of the friction parts.

18. The method of claim 1, wherein a transition from one winding ratio to another winding ratio takes place on an inside diameter of the friction parts.

19. A friction lining for clutches or brakes, as claimed in claim 1, comprising:
- at least one winding, the winding having only a first layer being formed from a first predetermined number of plies, a second layer being formed from a second predetermined number of plies and a third layer being formed from a third predetermined number of plies,
- wherein the first predetermined number of plies, the second predetermined number of plies and the third predetermined number of plies are each wound with a different winding ratio from a coherent piece of impregnated yarn, and
- wherein the first layer and the third layer are wound from friction yarn and the second layer is wound from reinforcing yarn.

* * * * *